United States Patent [19]

Lomet

[11] Patent Number: 5,806,065
[45] Date of Patent: Sep. 8, 1998

[54] DATA SYSTEM WITH DISTRIBUTED TREE INDEXES AND METHOD FOR MAINTAINING THE INDEXES

[75] Inventor: David B. Lomet, Redmond, Wash.

[73] Assignee: Microsoft Corporation, Redmond, Wash.

[21] Appl. No.: 642,764

[22] Filed: May 6, 1996

[51] Int. Cl.[6] .................................................. G06F 17/30
[52] U.S. Cl. ................................ 707/8; 707/3; 711/130; 395/200.53
[58] Field of Search ..................................... 395/617, 677, 395/200.53, 182.02; 707/8, 3, 202; 711/130

[56] References Cited

U.S. PATENT DOCUMENTS

| | | | |
|---|---|---|---|
| 4,611,272 | 9/1986 | Lomet | 707/3 |
| 5,230,047 | 7/1993 | Frey, Jr. et al. | 395/182.02 |
| 5,276,872 | 1/1994 | Lomet et al. | 707/202 |
| 5,293,618 | 3/1994 | Tandai et al. | 711/130 |
| 5,434,994 | 7/1995 | Shaheen et al. | 395/617 |
| 5,581,753 | 12/1996 | Terry et al. | 395/617 |
| 5,581,765 | 12/1996 | Munroe et al. | 395/677 |
| 5,606,669 | 2/1997 | Bertin et al. | 395/200.53 |
| 5,642,501 | 6/1997 | Doshi et al. | 707/8 |
| 5,717,921 | 2/1998 | Lomet et al. | 707/100 |

OTHER PUBLICATIONS

Johnson et al. "A Distributed Data–balance Dictionary Based on the B–link Tree", MIT Laboratory for Computer Science Technical Report MIT/LCS/TR–530, Feb. 1992.

Johnson et al. "Distributed Indicies for Accessing Distributed Data", Twelfth IEEE Symposium on Mass Storage Systems, pp. 199–207, 1993.

Evangelidis, George "The HB Pi–Tree: A Concurrent and Recoverable Multi–Attribute Index Structure", A Thesis-:Northeastern Univ., Jun. 1994.

Johnson et al. "Lazy Updates for Distributed Search Structures", University of Florida, pp. 1–21, Dec. 1, 1992.

Evangeldis et al. "Node Deletion in the hB Pi–Tree", pp. 1–15, No date.

Duchamp et al. "An Interface to Support Lazy Replicated File Service", Management of Replicated Data, 192 Workshop, pp. 6–8, 1992.

(List continued on next page.)

*Primary Examiner*—Thomas G. Black
*Assistant Examiner*—Charles L. Rones
*Attorney, Agent, or Firm*—Lee & Hayes, PLLC

[57] ABSTRACT

A data system has a data server and multiple clients. The data server organizes data according to a tree index structure, where memory pages used to store data are indexed by higher level index nodes in the tree structure. The index nodes are replicated and maintained locally at the clients. The data organization on the server is further characterized by use of indexed side links between data pages to provide side access traversal, such as a Pi-tree structure. During a search for a particular search space, a requesting client traverses its own index replica until reference is made to a data page at the server. If the request causes a data page split or otherwise changes the storage location of a particular search space, the server sends information back as part of the result message to the requesting client to update the tree index replica. However, no coherence messages are sent to other clients. Instead, the other clients learn of data page splits and other changes to the search space in their own time when they request the search space. When a second client tries to access a search space that has changed due to activity of the first client, the second client is initially directed to the data page it expects to contain the search space. The server then side traverses the data pages using the indexed side links until the actual data page with the search space is located. Each side traversal results in its index term being included in the result message. Such index terms, when received at the index replica, are posted in the replica maintained at the second client to update that index replica. Accordingly, replicas are maintained as a by product of their individual search requests, thereby removing the need for coherence or other coordination messages among all index replicas.

22 Claims, 13 Drawing Sheets

OTHER PUBLICATIONS

Ladin et al. "Lazy Replication: Exploiting the Semantics of Distributed Services", Management of Replicated Data, 1990 Workshop, pp. 31–34, 1990.

Matsliach et al. "A Combined Method for Maintaining Large Indicies in Multiprocessor Multidisk Environments", IEEE Transactions on Knowledge and Data Engineering, v6., n3., pp. 479–496, Jun. 1994.

Tait et al. "Service Itnerface and Replica Management Algorithm for Mobile File System Clients", Parallel and Distributed Information Systems, 1991 Int'l Conf., pp. 190–197.

Wiederhold et al. "Consistency Control of Replicated Data In Federated Databases", Management of Replicated Data, Workshop, pp. 130–132, Jul. 1990.

Liebherr et al. "The Effect of Index Partitioning Schemes on the Performance of Distributed Query Processing", IEEE Transactions on Knowledge and Data Engineering, v.5, n3. pp. 510–522, Jun. 1993.

Maass et al. "Replicated Distributed Directory Services for Mobile Commnunications Networks", Serivces in Distributed and Networked Environments, 1994 1st Int'l Workshop, pp. 90–97.

Antoshenkov et al. "Order Preserving String Compression", Data Engineering, 1996 12th International Conference, pp. 655–663.

Lomet, David "Provate Locking and Distributed Cache Management", Parallel and Distributed Information Systems, 1994 Int'l. Conf., p. 151–159.

Lomet, David "Using Timestamps to Optimize Two Phase Commit", Parallel and Distributed Information Systems, 1993 Int'l Conf., pp. 48–55.

Evangeldis et al. "The hB Pi–Tree: A Multi–Attribute Index Supporting Concurrency, Recovery, and Node Consolidation", pp. 1–51, 1993.

Nicklas et al. "A Parallel Solution to the Cutting Stock Problem for a Cluster Workstations", High Performance Distributed Computing, 1996 5th Int'l Symposium, pp. 521–530.

"Silicon Graphics IRIX", Worldwide IT Analyst, pp. 1–13, Mar. 1997.

Carey, M. DeWitt, et al., Object and File Management in the EXODUS Extensible Database System, $12^{th}$ Int'l Conference on Very Large Data Bases, (Aug. 1986) pp. 91–100.

Evangelidis, G. et al., The hB–Pi–Tree: A Modified hB–tree Supporting Concurrency, Recovery and Node Consolidation, $21^{th}$ VLDB Conference, Zurich, Switzerland, 1995.

Johnson et al., Lazy Updates for Distributed Search Structure, SIGMOD, (May 1993) Washington, D.C., pp. 337–346.

Brigitte Kroll, et al., Distributing a Search Tree Among a Growing Number of Processors, SIGMOD, Minneapolis, MN, 1994, pp. 265–276.

Lehman P., et al., Efficient Locking for Concurrent Operations on B–Trees, AMC Transactions on Database Systems, vol. 6, No. 4, Dec. 1981, pp. 650–670.

Litwin, W., et al., LH*—Linear Hashing for Distributed Files, SIGMOD, 1993, Washington, D.C., pp. 327–336.

Litwin et al., RP*—A Family of Order–Preserving Scaleable Distributed Data Structures, $20^{th}$ VLDB Conference, Santiago, Chile 1994, pp. 1–12.

Lomet et al., Access Method Concurrency With Recovery, SIGMOD, May 1992, San Diego, CA, pp. 351–360.

Vingralek, et al., Distributed File Organization With Scalable Cost/Performance, SIGMOD, May 1994, Minneapolis, MN, pp. 253–264.

Devine, R., "Design and Implementation of DDH: A Distributed Dynamic Hashing Algorithm," $4^{th}$ Int'l Conf. On Foundations of Data Organization and Algorithms, Oct. 1993, Evanston, Ill.

DATA SYSTEM WITH DISTRIBUTED TREE INDEXES AND METHOD FOR MAINTAINING THE INDEXES

TECHNICAL

This invention relates to data systems having distributed indexes which are replicated over multiple sites. This invention also relates to distributed data systems, in which data is distributed among multiple sites, having multi-site replicated indexes. More particularly, this invention relates to such data systems that are configured using a π-tree index structure.

BACKGROUND OF THE INVENTION

Data management is a field of technology concerning the efficient storage, management, and retrieval of information. Data management is an increasingly important field of technology as more information is being stored and managed electronically. Banks, airlines, universities, hospitals, government agencies, and other large organizations are placing more reliance on electronic data storage and retrieval mechanisms as a way to effectively manage the exploding volume of information required to service a growing population of people. It is familiar practice today for a traveler to purchase airline tickets by telephone, and then to simply check in at the appropriate ticket gate to obtain a boarding pass. This convenience is afforded through sophisticated data management techniques which correlate the traveler with a particular flight, and stores this information in a format which is conducive to easy and instantaneous retrieval. Moreover, this information, which is most likely stored in one or a few sites, is readily available to gate attendants and ticket agents who are located at different remote cites.

Data management systems commonly organize data into files which are logical collections of similar information. These files are organized to provide efficient and ready access to data. The type of file organization depends upon how the data is primarily to be used. Running statistics on a body of data (e.g., deriving an average height and weight of all registered drivers in Washington state) may not require any ordered structure. On the other hand, accessing a specific data record in a database (e.g., looking up an airline reservation for a specific traveler) requires that the data files be structured in some manner.

Structured databases typically employ some form of indexing. An index gives the address on a physical storage medium (disks, CD ROMS, etc.) where a particular data record is located. FIG. 1 shows a simple data structure consisting of records A–Z which are sorted in alphabetical order. Storage mediums are commonly organized into "pages" of memory with the pages reflecting the physical memory capacity that is available to store data. For this simplified example, suppose that each record is stored on its own page of memory.

A binary search of this ordered database can be composed using a conventional divide-and-compare approach to locate a particular data record, say data record R. A processor divides the data structure at the mid-point, which falls on record M (as indicated by reference arrow 1). This location in the structure is evaluated to determine whether record R falls after or before record M. In this structure, record R is situated after record M. The processor thus proceeds to divide the lower half of the data structure, moving the pointer to record S (as indicated by reference arrow 2). Since record R falls before record S in the data structure, the next iteration divides the structure between records M and S at the location of record P (as indicated by reference arrow 3). On the fourth iteration (or perhaps the fifth), the target record R is located.

While this binary search approach is intuitively straightforward, it is impractical for large amounts of data. Each search iteration requires access to the storage medium. In our example, assuming that each record is stored on its own page of memory, at least four disk accesses are required to locate record R. The binary search approach of FIG. 1 has a search efficiency of $\log_2(n)$, where "n" is the number of records in the record (in this case, 26 records). If "n" is very large (e.g., millions of records), then the binary search procedure is far too slow for practical use because too many disk accesses are required.

Index trees have evolved as an efficient way to access data on a storage medium. FIG. 2 shows a binary index tree of the same database of records A–Z that is described in FIG. 1. In this binary index tree, each node branches to two nodes lower in the structure. Additionally, each node is stored on its own page of memory. A comparison analysis is performed at the base node to determine which branching condition to take. In this example, node M represents the center point of the alphabetically ordered database of records A–Z. If the target record falls after record M, the processor branches to node S, the midpoint of the lower half of the alphabet. Conversely, if the target record lies before record M, the processor branches to node F, the midpoint of the upper half of the alphabet. Accordingly, the root node M branches to two nodes, which both then branch to two more nodes, and so on. To find record R, the processor would proceed down the index tree from root node M, to node S, to node P, and to node R.

Converting the binary table structure of FIG. 1 to a binary index tree of FIG. 2 has not solved the problem of storage access. Assuming that each node is stored on its own page of memory, the index tree of FIG. 2, like the binary table structure of FIG. 1, requires four disk accesses to locate record R and has an overall search efficiency of $\log_2(n)$. In a binary index tree, the number of disk accesses can be associated with the levels of the tree. Records that are deeper in the tree require more accesses. Record S is on the second level down and requires two accesses to locate it. In contrast, record R is four levels deep and requires four accesses to locate it. The binary index tree is simply too slow for most modem day data management tasks.

To reduce the number of storage accesses and thereby improve search efficiency, index trees are constructed with less depth and more branches from each node. In large data structures, for example, it is common to use an "m"—branch tree having m branches from each higher level node. An m-array search tree is a generalization of a binary search tree in which each node has at most "m" children. An m-array search tree has a search efficiency of $\log_m(n)$, where "m" is typically on the order of 100 to 250.

An index tree known as a "B-tree" is one approach to constructing an "m"—branch index tree. The "B-tree" structure is particularly beneficial because it accommodates the practical constraints imposed by physical storage mediums. As noted above, storage mediums are commonly organized into memory pages which reflect the physical memory capacity that is available to store data. The B-tree is a paginated search structure in which the indexes to the data are constructed upward from the data itself with the goal of optimizing I/O access to the pages of memory.

FIG. 3 shows a simple two level "B-tree" index structure. In the illustrated B-tree, all of the data resides at level 0 of the tree on pages $P_1, \ldots, P_M$ of physical memory and all of the pointers to the data are constructed in levels 1 on up, as represented by index node $I_1$. This structure, where all of the data is on the same level, is also known as a "B+-tree" index structure.

Initially, data is stored on one page of the storage medium (e.g., page $P_1$). As more data is added to the database and exceeds the physical capacity of the single page, the data is split evenly over two pages (e.g., pages $P_1$ and $P_2$) whereby data falling on one side of a boundary condition remains on the first memory page and data falling on the other side of the boundary condition is moved to the new memory page. When data spills over to another page of memory, a "separator" defining the boundary condition between the data on the memory pages is added to the index node $I_1$. This method of splitting the data evenly between two memory pages and posting a separator within the index node that is the parent of the data nodes, incrementally maintains the database in condition to accept new data entries without having to periodically reorganize the entire database.

The data page separators maintained in index node $I_1$ are also stored on pages of memory. Separators are continually added to the index node in correspondence with each new page of data until the physical capacity limit of the page holding index node $I_1$ is exceeded. The physical page size is surpassed when data fills the $M^{th}+1$ page of data, meaning that the index node $I_1$ already contains indexing terms to M different memory pages, as indicated by pages $P_1, \ldots, P_M$, and cannot accommodate another index term. When this occurs, the index node itself is symmetrically bifurcated onto two memory pages, with half of the pointers remaining on the original memory page and the other half of the pointers being moved to the new memory page.

Splitting an index node adds another level to the B-tree index structure. FIG. 4 shows the FIG. 3 index structure following evolution to a point where the index node $I_1$ is split into two level one index nodes $I_{L1-1}$ and $I_{L1-2}$. A level two index node $I_{L2-1}$ is then added to the B-tree to provide the boundary conditions between the level one index nodes $I_{L1-1}$ and $I_{L1-2}$. The level two index node $I_{L2-1}$ will continue to add pointers to distinguish among the index nodes at level one until the page memory for the level two index node $I_{L2-1}$ is exceeded. At that point, a new level two index node $I_{L2-2}$ is added and a new level three is added to the index tree with an index node that distinguishes between the two level two index nodes $I_{L2-1}$ and $I_{L2-2}$. In this manner, a new level is added to the B-tree when the index node at the previous top level splits for the first time.

As the tree grows, index nodes will be splitting at various locations within the tree. The decision and process of splitting a node is handled independently and locally, without disrupting the other parts of the data structure.

B-trees (or B+-trees) are the most widely used indexing method in practice today. The B-tree structure is very efficient and conducive to accessing data in large file structures. The bottom-up construction of the B-tree index allows easy and dynamic growth as new data is added. B-trees are particularly useful for conducting range queries where a database manager might request all files that satisfy a certain set or range of parameters. For instance, the IRS might wish to identify all taxpaying citizens with an income of $37,000 to $38,000. If finding ranges is not important-for instance, identifying individual taxpayers using a social security number-conventional hashing search techniques can be used rather than index trees.

A problem arises in large B-tree configured databases when one user attempts to update the index structure while another user is concurrently searching the index structure. The situation in which a searcher is pointed to a non-existent or incorrect location because the updater changed the tree configuration must be avoided. One conventional technique to avoid this situation is through the use of "locks." When an updater is performing an update, the updater posts an exclusive lock (known as an "X-lock") on the database so that no one can enter the database until the updates are completed. When the X-lock is posted, no searcher can use the database until the updates are completed and the X-lock is removed.

The searcher is also given the privilege of setting a shared lock (known as an "S-lock") on the database during searching. The shared lock can be posted by any number of searchers as the database can facilitate multi-user access. When the S-lock is posted, other searchers can use the database, but the updater is prevented from updating the database until the search is completed and the S-lock is removed.

In theory, these locks could be placed at the root of the index tree (i.e., the top level node) to prevent access to the entire database. In practice, however, root-level placement is not used because it locks all of the users out of the database each time the updater wants to update the file structure, even though the update only concerns a small portion of the database.

A modified approach is to have the updater and the searcher only place S-locks on the higher-level nodes as they snake down through the tree, and an X-lock at the bottom level node. A drawback to this modified approach is that it does not account for the situation where two updaters are performing updates following a memory page split of the data which occurs beneath a shared resource. Both updaters want to change their respective S-locks to X-locks so that they may perform the required update without interference from other searchers or updaters. However, both updaters are prevented from making the change due to the others S-lock. This situation results in "deadlock" where neither updater can update the database.

One approach to preventing deadlock in B-tree index structures is a technique known as "B-link tree." When a data node is split to form two nodes, a "side pointer" is included in the original node to provide direction to the related new node that contains part of the split data. FIGS. 5a and 5b show a portion of a B-link tree before and after a data node split. Prior to the node split (FIG. 5a), the index node $I_1$ contains pointers to both data nodes $P_1$ and $P_2$, and $P_1$ contains a pointer to $P_2$. When $P_1$ becomes full, a new node $P_{12}$ is added between $P_1$ and $P_2$ and half of the data on $P_1$ is shifted to the new intermediate node $P_{12}$ (FIG. 5b). However, rather than immediately updating the index node $I_1$ with a pointer to the new data node $P_{12}$, a local "side pointer" 20 is included in $P_1$ to reference the new node $P_{12}$. Additionally, a side pointer 22, copied from pointer 21, is added to bridge the data page $P_{12}$ with the adjacent page $P_2$ to keep the nodes chained together. Usually a pointer and index term are then promptly added to the index node $I_1$ so that searches for data stored in $P_{12}$ can be efficiently performed.

There is no direct pointer from the index node I1 to the new data page P12 until this index term and pointer are posted. Should a search for data in P12 take place before the index term and pointer are posted in I1, it can succeed by being directed to node P1. After failing to find in that node the data desired, the side pointer 20 is followed to node P12 where the search succeeds.

The B-link trees permit concurrency in updates and searches. Suppose that the searcher is looking for a file on page $P_1$, but before getting to the target file, an updater splits the page $P_1$ and moves the target data to the newly created page $P_{12}$. The searcher will be directed by index node $I_1$, which has not yet been updated with a pointer to the new memory page, to the page $P_1$. Due to the side pointer 20, the searcher can continue the search to the new page $P_{12}$ and locate the target data. Further background information on B-link trees can be found in an article by P. Lehman and B. Yao, entitled "Efficient Locking for Concurrent Operations on B-trees," which was published in the December 1981 issue of *ACM Transactions on Database Systems* on pages 650–670. This article is hereby incorporated by reference.

Besides concurrency, another concern in data management is protecting the index structure in the event of power failure or other system crash. This feature is known as "recovery." While B-link trees permitted concurrent operation among the searchers and updaters, there was a continuing need to provide an index structure that facilitated both access concurrency as well as recovery.

This need prompted development of an index structure known as a "π-tree" or "Pi-tree." The Pi-tree was first introduced by the inventor and a colleague in an article entitled "Access Method Concurrency with Recovery," published in *Proc. ACM SIGMOD Conf.*, May 1992, pages 351–360. This paper is hereby incorporated by reference to provide additional background information concerning Pi-tree index structures. This work also spawned U.S. Pat. No. 5,276,872, entitled "Concurrency and Recovery for Index Trees with Nodal Updates Using Multiple Atomic Actions by Which Trees Integrity is Preserved During Undesired System Interruptions." This patent is also incorporated by reference.

FIG. 6a–6d show a two dimensional search space defined by X and Y coordinates as it is partitioned by a Pi-tree. The search space might represent, for example, longitude and latitude in a satellite-based geographical positioning systems. The two-dimensional search space is bounded in the X dimension at a lower extent 0 and a higher extent 10, and in the Y dimension at a lower extent 0 and a higher extent 6. In the first representation of the Pi-tree search space (referenced generally as number 30) shown in FIG. 6a, a node or region A fills the entire two-dimensional search space.

As data is added to the region A and begins to exceed the physical memory page of node A, the node A is split, analogously to the splitting of the node described above with respect to FIGS. 3–5 in the single dimension index trees. In this example, region A is split along a hyperplane boundary X=7 to produce the second representation of the Pi-tree search space 32 illustrated in FIG. 6b. This creates region B which has an X dimension bounded at a lower extent 7 and a higher extent 10, and a Y dimension bounded at a lower extent 0 and a higher extent 6. An indexed side link 33 from "containing" sibling region A to sibling region B is posted to sibling region A for use in directing a search to the sibling region B. The containing sibling is the node from which the new node was split when newly created. This indexed side link 33 includes index terms that describe the space under the responsibility of the sibling region and a pointer to the sibling region. This "indexed side link" supports both single- and multi-dimensional searching. With multi-dimensional index structures, the search direction of a side link is supplied explicitly by the index structure. In this example, the indexed side link contains reference to the boundaries of region B, and can be expressed as "B:(7,10,0,6)", which adheres to the pattern "Region:(low X, high X, low Y, high Y)."

Within a single level of the Pi-tree, each node is given responsibility for a well defined part of the search space when it is created. Node A is initially responsible for the entire space bounded by X=0 to 10, and Y=0 to 6. The entire space for which a node is responsible is reachable from that node. A region can delegate responsibilities for part of its own search space to a new region during a split. Here, region A delegated responsibility to region B over space bounded by X=7 to 10 and Y=0 to 6. To maintain the invariant that the entire search space for which the original region is responsible be reachable from that region, an indexed side link is posted at the original region to reference the new region and identify the space for which the new region is responsible. In this example, the indexed side link references the new region B, and identifies the space X=7–10, Y=0–6 for which region B is now responsible.

Region A is further split along a hyperplane boundary Y=4 to produce a third representation of the Pi-tree search space 34 which is illustrated in FIG. 6c. This creates region C. An indexed side link 35 is posted at region A to provide direction to the new sibling region C. The indexed side link 35 is represented as C:(0,7,4,6). Last in this example, region B is split along a hyperplane boundary Y=3 to create region D, as illustrated in a fourth representation of the Pi-tree search space 36 in FIG. 6d. An indexed side link 37 is posted in parent region B to provide direction to sibling region D. The indexed side link 37 is represented as D: (7,10,3,6).

When a region is split, the index term and pointer are also posted to the parent node of the splitting node, as in the one-dimensional B-link-tree case. The indexed side links of the Pi-tree provide high concurrency during tree structure modifications and ensure that recovery of the search tree is possible should the system crash at any arbitrary time. The indexed side links define multiple paths to the data pages. During a node split, an updater can still gain access to a new node via an indexed side link, even before the index term is posted in the parent node. Accordingly, a Pi tree does not need to X-lock or S-lock on more than one node at a time while data nodes are split or searched.

The same kind of reasoning that permits concurrency enables one to separate the structure modification into two atomic parts for recovery. Atomic action #1 splits a full node and provides an indexed side link to the new node in the original full node. Atomic action #2 posts the index term to the new node's parent. In the event that a system crash occurs between the time a node has split and the time the index term for the new node is posted to its parent, its data remains accessible via the indexed side link and the structure is search correct. Should the system crash between the node split and the posting of the index term, the only thing that remains following the system crash is to ensure that the index term is eventually posted so that performance remains logarithmic in the size of the data.

Posting an index term to the parent is facilitated by the Pi-tree indexed side links. Upon traversal of the indexed side link by a searcher, the index tree will update the parent node with the index term for the new node. This permits direct access to the new node from the parent. The posting of the index term is not an issue of search correctness, but solely of search performance.

Until the present invention, however, there has been no effort to use the Pi-tree in a distributed index structure where indexes are replicated and maintained at more than one site. To illustrate the concept of replicated index systems, consider the server/client system shown in FIG. 7. The server/client system 40 comprises a server computer 42 and two client computers 44 and 46. All of the data is stored centrally at the server computer 42. A Pi-tree file structure is employed to direct data searchers and updaters to specific data stored at the server computer 42. To facilitate fast and convenient user access to the data, the upper levels of the Pi-tree file structure are maintained at each client computer 44 and 46. A master copy of the file structure is also kept at the server computer 42. This architecture of maintaining copies of the indexes at multiple clients is known as a "replicated index structure."

A replicated index structure enables each client computer to perform the initial part of the search on its own, without assistance from the server. The client computers only bother the server when attempting to access their target data . By moving much of the search to the client end, the replicated index architecture improves system response time and minimizes network traffic.

One problem that arises in replicated index structures is how to keep current each copy of the index at the multiple clients. For example, when a data node is split at the server computer 42 as a result of storing more data in excess of a page limit, the index replicas on the multiple clients should be updated to reflect the is change in search space. The traditional way to perform this updating task is for the server 42 first to update its own master copy of the upper branches of the index tree; it then passes update corrections 48, known as "coherence messages," to every client to update their replicated versions of the index tree. The coherence message ensure that each client has the most recent version of the index tree, and that all of the index tree replicas within the system are approximately uniform.

Sending coherence messages 48 to each client has several drawbacks including message delays, an increase in traffic on the network, down or non-receiving clients, and so on. These problems are amplified when scaled to larger and boundless quantities of data.

Distributed data architectures have evolved as one plausible technique to accommodate the exploding supply of electronic data. In such architectures, data sets are spread over multiple computing sites. The replicated index structures are configured to first direct requests to the appropriate site, and then to the appropriate memory location at that cite. Imagine the limitless data set that is available today on the Internet, which is nothing more than an unbounded amount of data spread over many computer systems around the world. This data set can be accessed by anyone, from anywhere. Attempting to manage replicated indexes across a vast system like the Internet using coherence messages is impractical.

There remains a need for a data search structure that is dynamically scaleable from small central data architectures to large distributed data architectures, yet alleviates the above noted problems of coordinating replicated indexes.

SUMMARY OF THE INVENTION

This invention concerns computer-implemented methods for managing data and maintaining index replicas in a data management computing system. The data is organized according to a tree index structure where data pages are located via paths through index nodes of the tree. The data organization is characterized by use of indexed side links between data nodes to provide side access traversal across these pages. The Pi-tree structure is one suitable implementation. Under this architecture, the data can be stored at single server or distributed across multiple server sites.

The tree portion containing index nodes is replicated and maintained locally at the clients supported by the server site(s). It too can make use of indexed side pointers between nodes at the same level in the index tree. During a search for a particular space, each client traverses its own index replica, usually descending from parent to child, but sometimes doing a side link traversal, until reference is made to a data page or index node at the server site(s). If the request causes a data page split or otherwise changes the location of a particular search space, the server sends a message back to the requesting client, along with the data requested, to update the index replica for that client.

There are no explicit coherence messages sent to clients. Clients learn of data page splits and other changes to the search space in their own time. When a second client tries to access a search space that has changed due to activity of the first client, the second client is initially directed to an earlier data page expected to contain the search space. The data pages are then side traversed using the indexed side links until the actual data page containing the search space is located. When the data page containing the search space is returned to the requesting client, the indexed side links used to reach the data page are returned with its contents. These indexed side links are then used to update the parent index node. Hence, each side traversal results in the posting of a new index term at the second client to update its index replica.

In this manner, replica maintenance is accomplished in a very lazy manner as a by-product of individual search requests. There is no requirement that the index replicas be the same, or similar, or even resemble one another. In fact, the replicas evolve quite independently, and might grow to different heights. Accordingly, coordination among the clients and use of broadcast coherence messages are eliminated using this methodology. The methods are therefore scaleable to large distributed data systems which support limitless numbers of clients. Note also that this technique is indifferent as to whether the index replica persists at the client, or whether it is generated via caching part of the server index there and hence is transient.

BRIEF DESCRIPTION OF THE DRAWINGS

FIG. 1 illustrates a prior art binary search technique used to locate a file in the data structure.

FIG. 7 demonstrates a prior art technique of broadcasting coherence messages to coordinate the index replicas at the various clients.

DETAILED DESCRIPTION OF THE PREFERRED EMBODIMENT

This discussion assumes that the reader is familiar with file structures and general data management techniques. A summary of file structures used in ordered data collections is provided in the Background of the Invention section. For additional background material on file structures, the reader is directed to the text entitled *File Structures: An Analytical Approach*, by Betty Salzberg, copyright 1988 by Prentice-Hall, Inc. This text is incorporated herein by reference.

Figure 1:
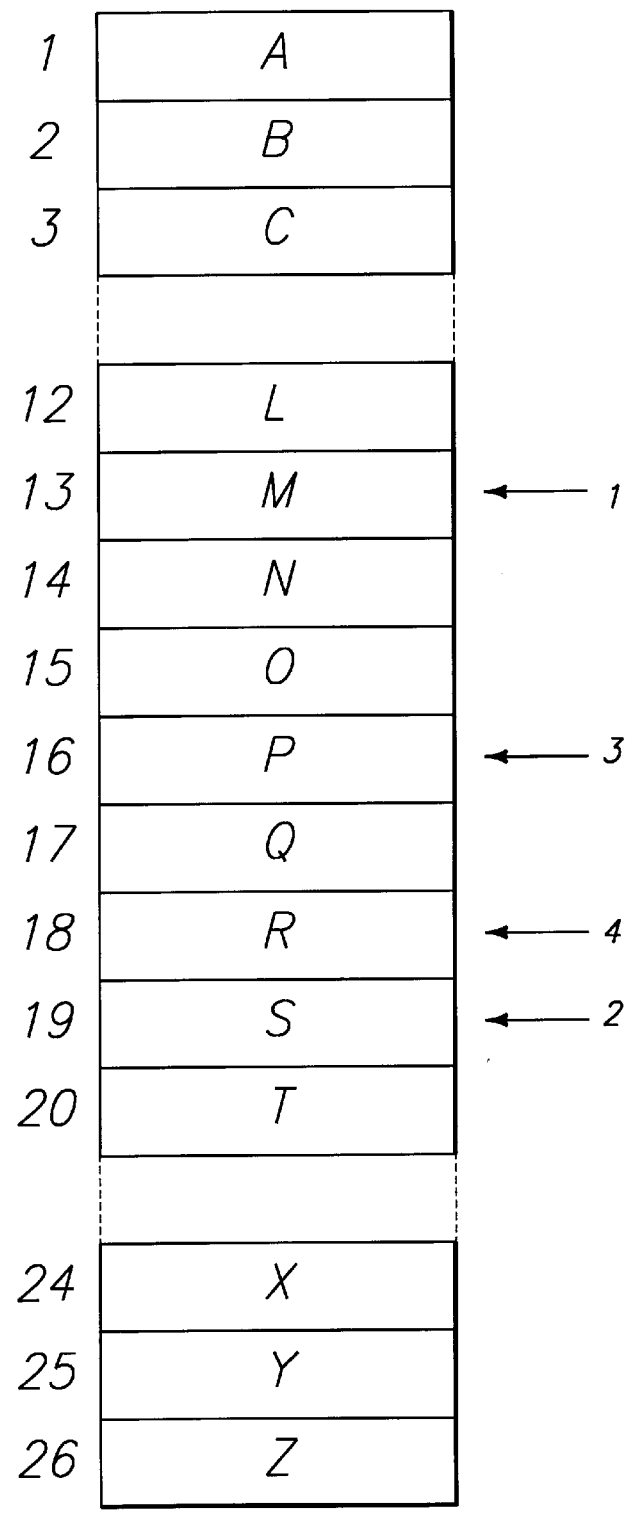
FIG. 1 is a diagrammatic illustration of a data structure comprising data with keys in the range A–Z which are sorted in alphabetical order.
Figure 2:
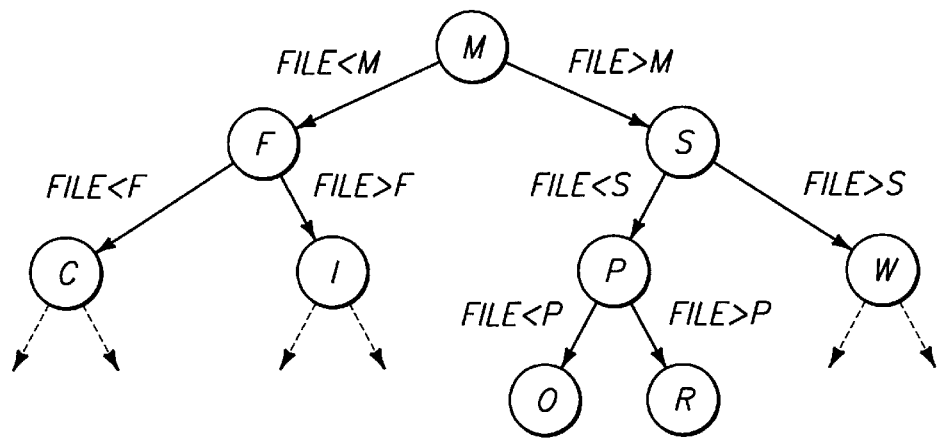
FIG. 2 is a diagrammatic illustration of a prior art binary tree index structure used to search the data A–Z.
Figure 3:
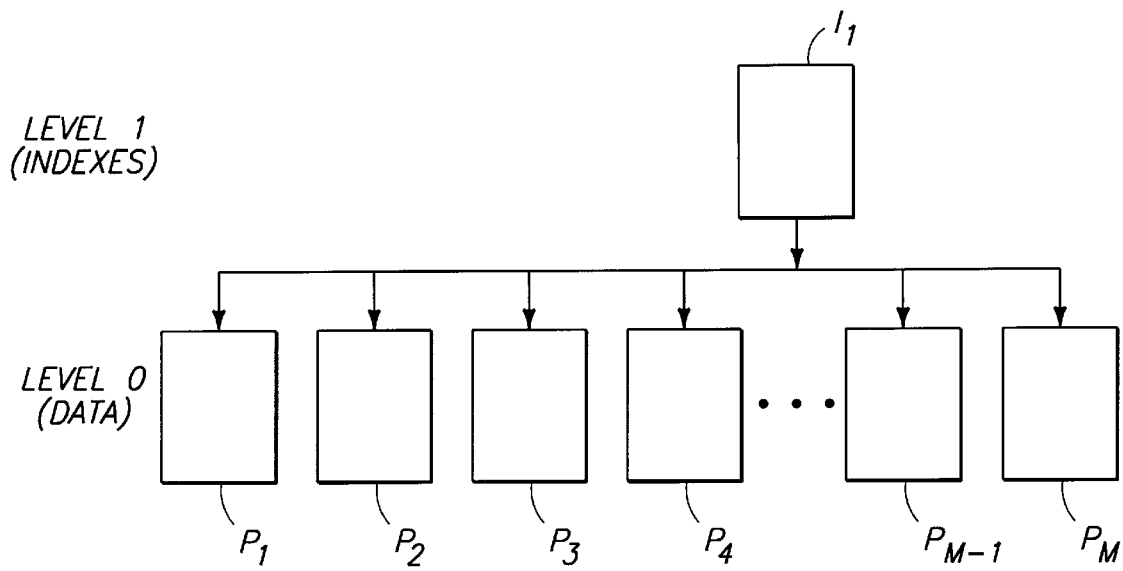
FIG. 3 is a diagrammatic illustration of a prior art dual level B-tree index structure having multiple branches from a single node.
Figure 4:
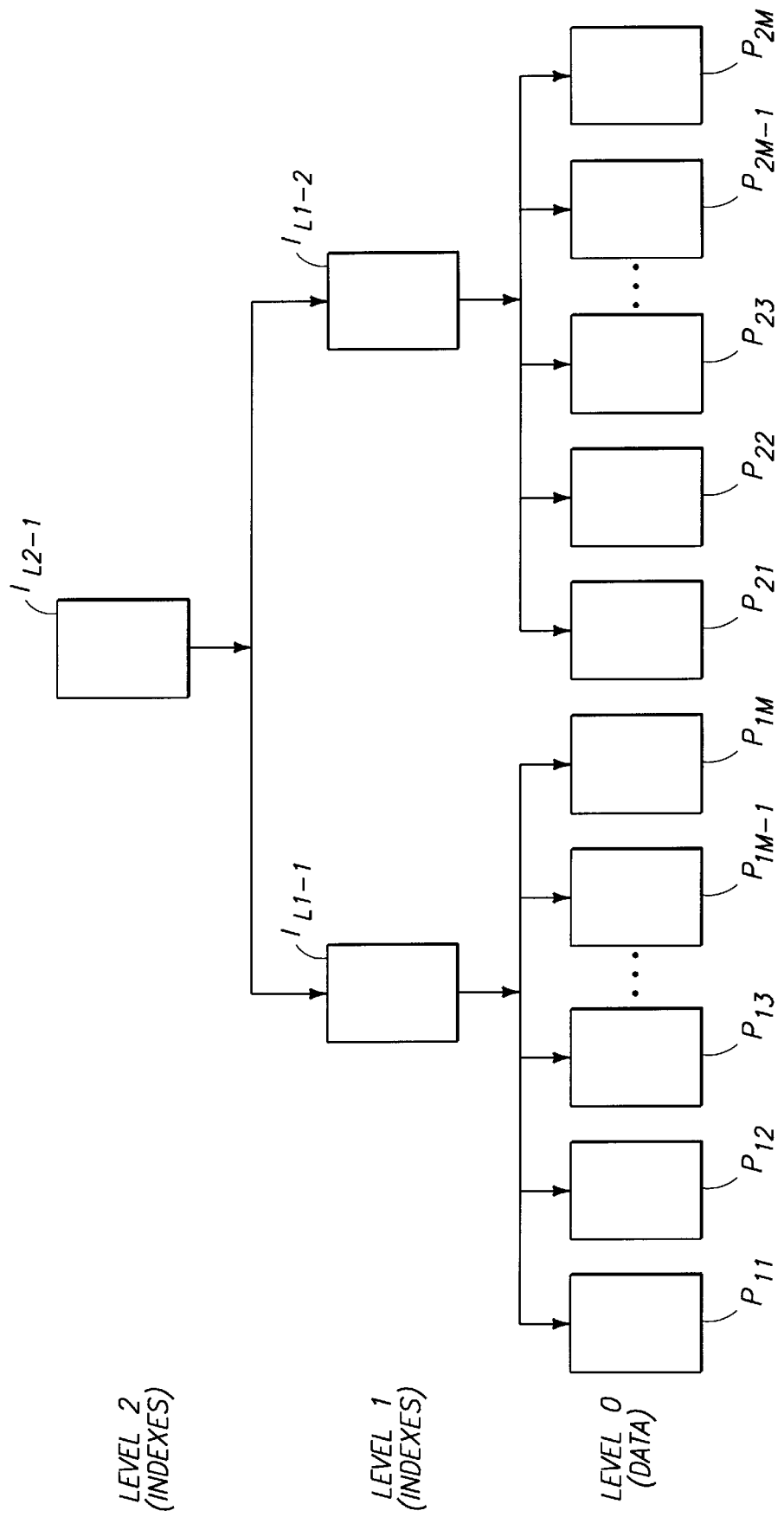
FIG. 4 is a diagrammatic illustration of the FIG. 3 B-tree index structure following an index node split.
Figure 5A:
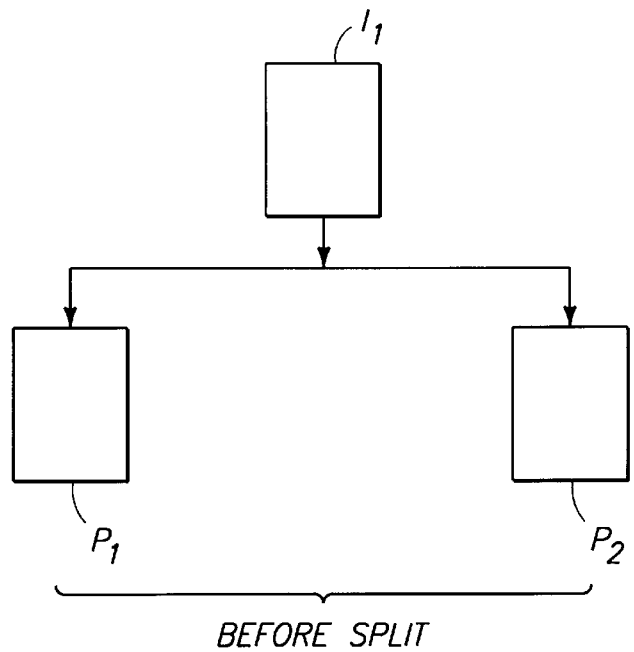
FIGS. 5a and 5b are diagrammatic illustrations of a portion of a B-link tree before and after a data node split.
Figure 5B:
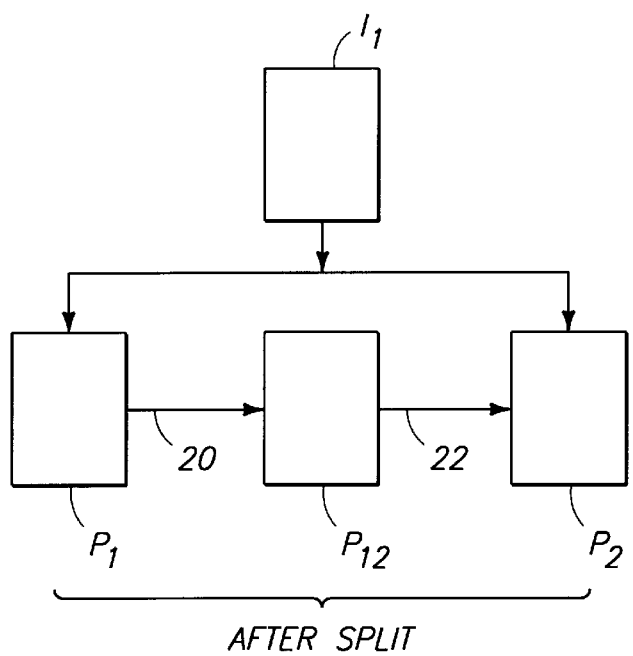
Figure 6A:
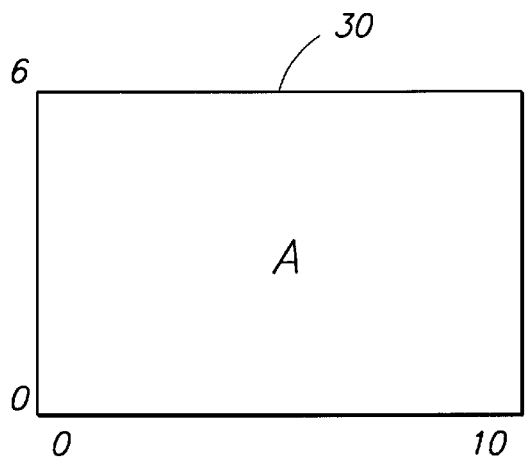
FIGS. 6a–6d are diagrammatic illustration of the space decomposition produced by a Pi-tree index structure during evolution of the search space as a result of node splits.
Figure 6B:
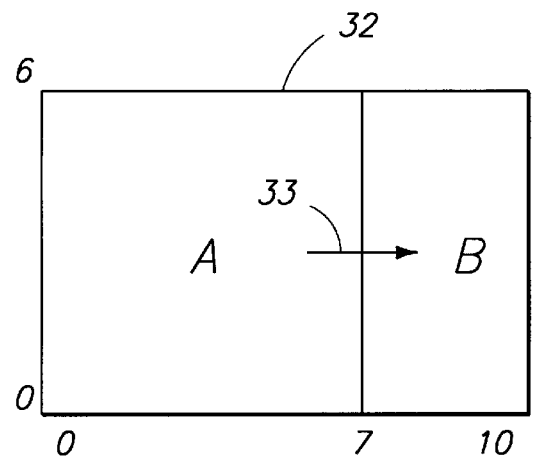
Figure 6C:
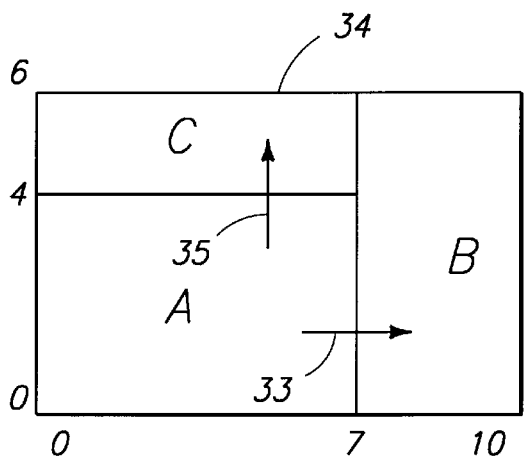
Figure 6D:
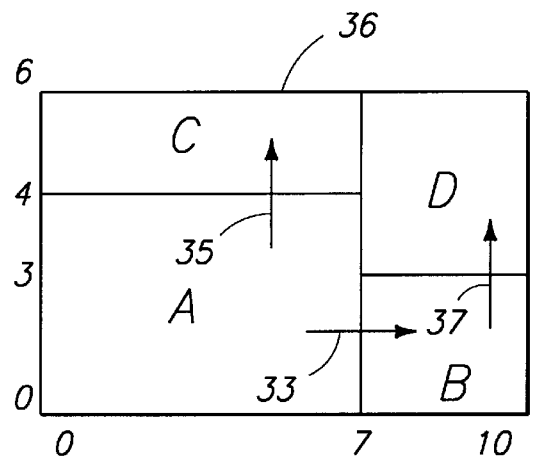
Figure 7:
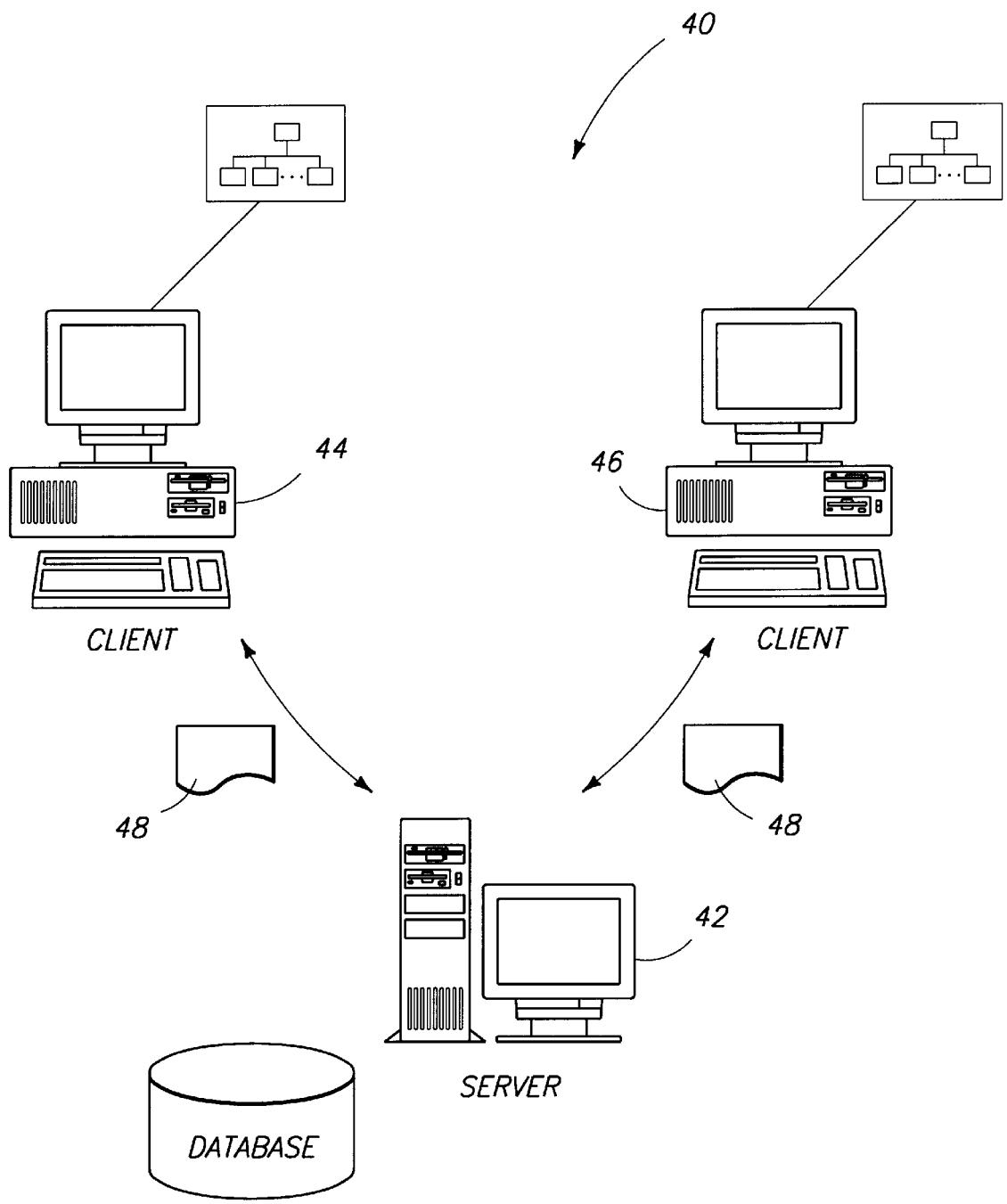
FIG. 7 is a diagrammatic illustration of a computer network with replicated indexes on the clients.
Figure 8:
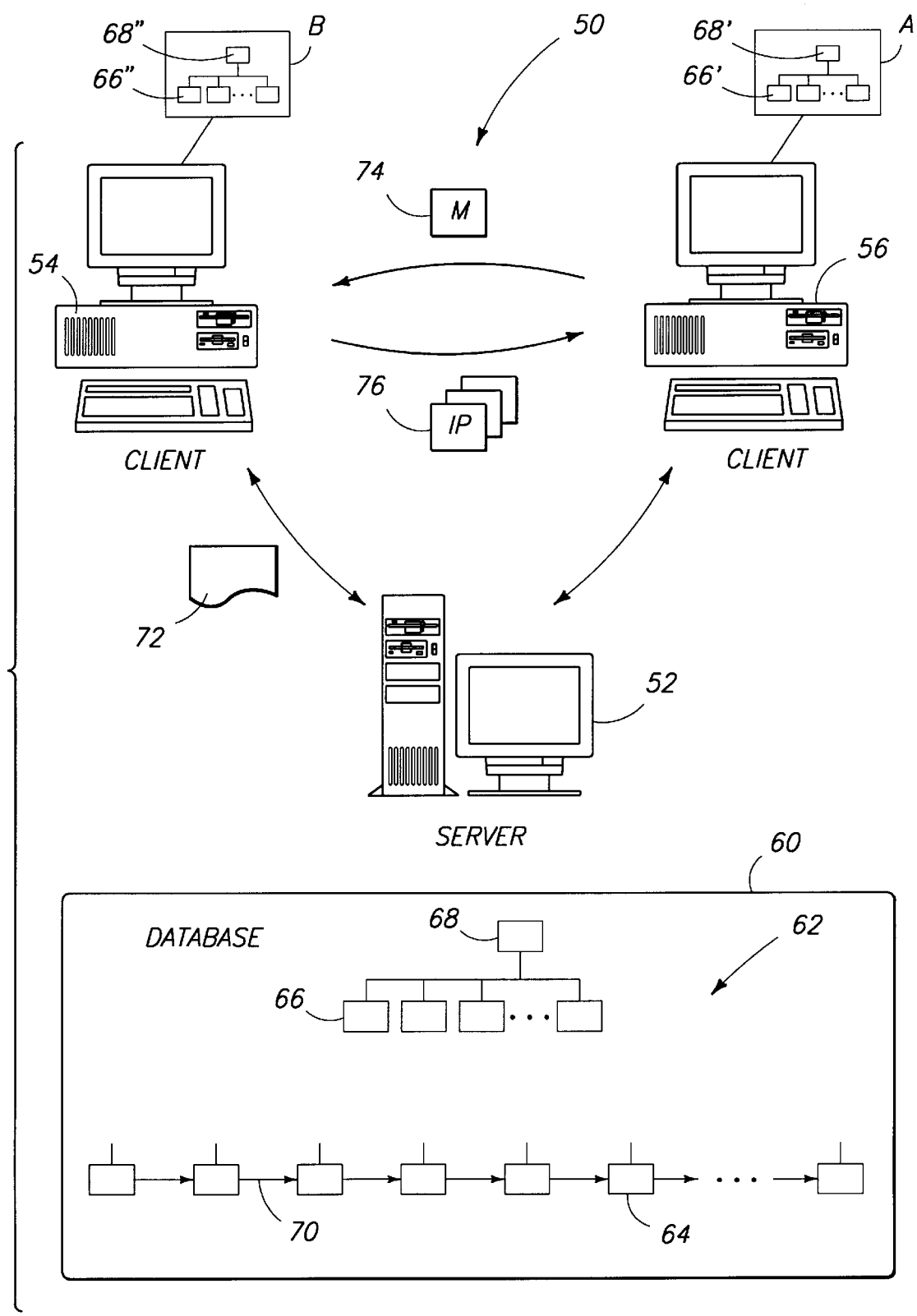
FIG. 8 is a diagrammatic illustration of a data system having a server and multiple clients. The data system is configured with replicated indexes at the clients which are maintained independently of one another according to an aspect of this invention.

FIG. 8 shows a data system 50 comprising a data server 52 and multiple client computing units, as represented by client computing units 54 and 56. The server 52 and client computing units 54, 56 are interconnected via a network, which is illustrated as arrows between the server and clients. A centralized database 60 is provided at the data server 52 and houses the data of the data system. The data system 50 is representative of many different real-world implementations, including a client/server system over a LAN (local access network) or WAN (wide area network); a cluster of peer networked computers or workstations that jointly serve the base data via replicated indexes; an online service provider/customer system on a public network such as the Internet wherein server 52 is the service provider and clients 54, 56 represent customer PCs; and a headend/set-top box system employed in interactive entertainment networks wherein server 52 serves as the headend and clients 54, 56 represent viewer set-top box and/or display units. The client computing units 54, 56 comprise processing capabilities and memory, including, perhaps, persistent memory such as provided by magnetic disks. They might also include an input device such as a keyboard, mouse, remote control handset, and an output device such as a monitor, TV, or other display unit.

The database 60 is configured in a tree index file structure 62 having data nodes 64 along the bottom of the tree and index nodes 66 growing upward toward the top of the tree. A root node 68 is provided at the very top of the tree 62. The data nodes 64 represent physical memory pages that store data. Such memory pages will also be referred to as "data pages." The index nodes 66 represent physical memory pages that store indexing terms and other information used to index the data pages. The memory pages that store indexing information will be referred to as "index pages."

The tree index file structure 62 has indexed side links 70 which permit side traversal from one data page to an adjacent data page. Each indexed side link contains an index term which describes the search space for which the referenced data page is responsible and a memory pointer to the physical address of the data page. Examples of the indexed side links include:

<all> X, pointer to FF075C3A>
<latitude, longitude, pointer to 0D045B28>

The tree index file structure 62 is illustrated in a single dimension search space, with branch conditions based upon a single attribute. The top example of an indexed side link contains an index term which describes a single dimension search space according to the attribute "all> X," and a pointer to memory location FF075C3A that maintains that search space. This invention is equally suited, however, for both single- and multi-dimensional search space. The tree index file structure can alternatively be represented in a two-dimensional space, such as that shown in FIG. 6, or in other multi-dimensional spaces. The lower example of an indexed side link contains an index term which defines a two dimensional search space according to two attributes "latitude" and "longitude," and a pointer to memory location 0D045B28 where the search space resides.

The tree index file structure 62 is preferably constructed as a Pi-tree which possesses such indexed side links. The index nodes at each level of the Pi-tree are connected by indexed side links, exactly as the data nodes are so connected.

The index nodes 66 and 68 of the tree file structure 62 are replicated and maintained locally at the client computing units 54, 56. The replicated index architecture allows much of the initial searching to be performed locally at the client computing units. This improves search and update performance, minimizes network traffic, and reduces the access activity on the database 60.

Each client computing unit 54, 56 independently accesses the database 60 to perform various actions. Example actions include search and retrieval, updates, load balancing, deletions, and so on. Each type of action is interested in a particular search space in the database that will be affected by the action. In a search or update, for example, the client is interested in locating a particular data record in the database.

Figure 9:
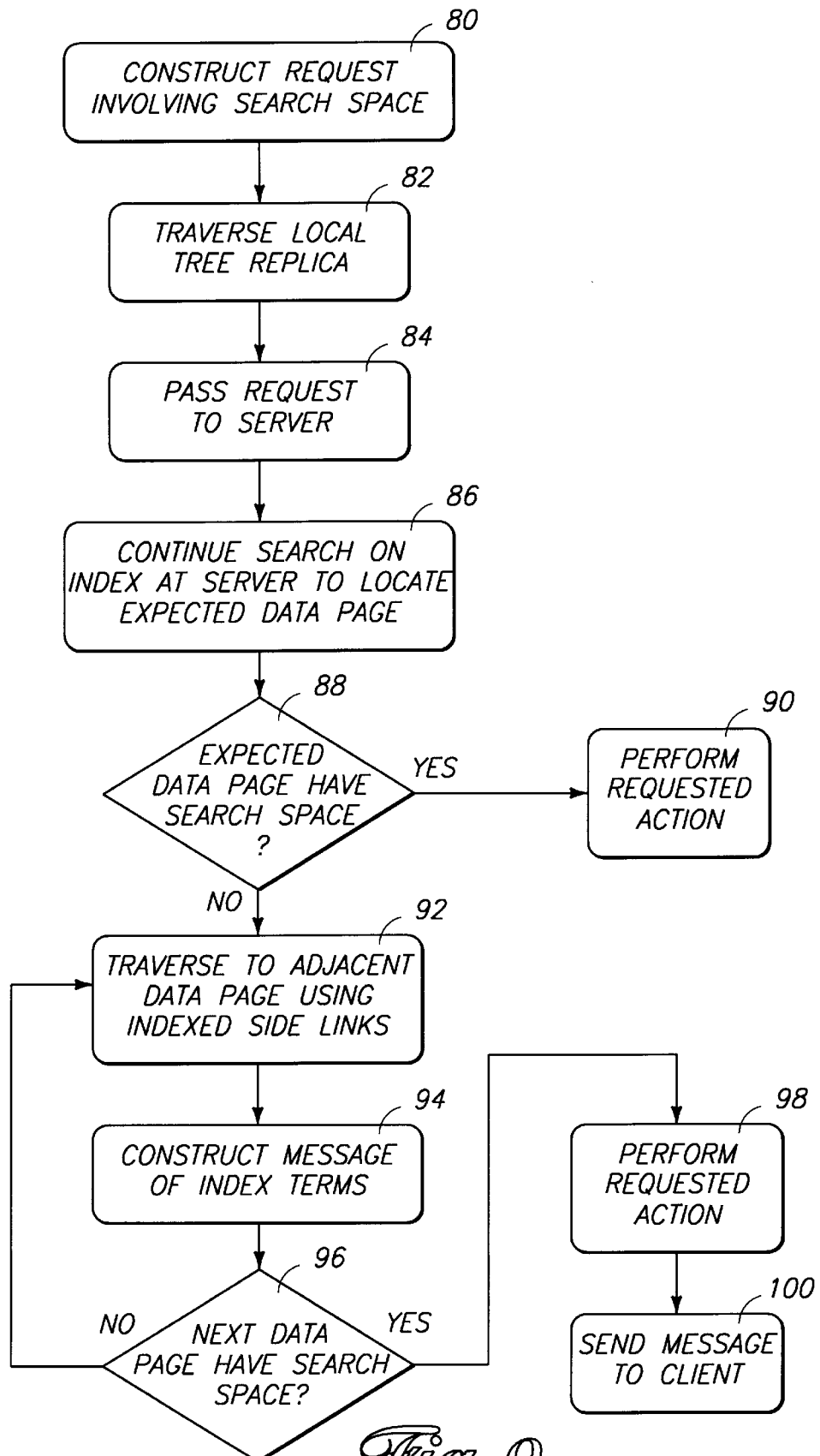
FIG. 9 show steps in a method for accessing data on the FIG. 8 data system and of modifying a local index replica as a result of said access.

FIG. 9 illustrates steps performed by the client processing units and data server during an action. The steps are implemented in one or more programs stored at the client processing units and data server which, direct the processors to perform the actions. At step 80, a client computing unit (e.g., unit 54) constructs a request for access to a particular search space. The search begins on the root node of the local replica of the tree index at the client computing unit 54 and continues down the underlying index nodes (step 82). The local index nodes are traversed until the search encounters an index term directing flow to an index or data node at the data server 52.

The request is then passed from the client computing unit 54 over the network to the data server 52 for completion at the lower index and/or data nodes 60 (step 84). The request includes an identification of the data page expected to contain the search space, which is acquired from the index term in the index node at the client computing unit 54, and a type of action to be performed on the search space. An update action request is also accompanied by the new data.

The data server 52 traverses the index nodes at the database 60 to locate the data page identified in the request (step 86). The desired search space may or may not be contained on the data page. For instance, the search space might have been split onto another memory page, or migrated elsewhere. Accordingly, it is initially determined whether the search space is contained on the expected data page (step 88). In the event that the search space is contained on the accessed data page (i.e., the "yes" branch from step 88), the data server 52 performs the transaction on the data (step 90).

In the event that the search space is not contained on the expected data page (i.e., the "no" branch from step 88) but is located on a different data page, the index replica at the requesting client 54 is presumed to be out-of-date and not accurately reflective of the present storage configuration. The data server 52 uses the indexed side links 70 to side traverse the file structure from data page to data page in search of the requested space (step 92). Each side traversal results in a side index term that should be added to the index replica at the requesting client 54 to make that index replica more complete. The data server 52 adds the index terms derived from each side traversal to a message 72 to be sent to the requesting client (step 94). The side traversal is continued until the server arrives at the actual data page that contains the requested search space (i.e., the loop formed by the "no" feedback branch of step 96).

When the search leads to the correct data page (i.e., "yes" branch from step 96), the data server performs the requested transaction (step 98). The data server 52 then sends the message 72 with the index terms across the network to the requesting client 54 (step 100). The client computing unit 54 updates its local replica of the tree index using the returned index terms so that the local replica is able to accurately identify the data page that contains the search space.

An aspect of this invention is that there are no simultaneous coherence messages sent to other client computing units, such as unit 56. Rather, only the client computing unit which initiated the search request is sent the update message 72. Other client computing units are updated independently as they discover on their own that their replica of the index tree is outdated. In this manner, each client computing unit is responsible only for its own index replica, and the data server need not waste processing resources attempting to coordinate the replicas at the many clients. Indeed, over time, the index replicas at different clients may evolve very differently so that they are no longer truly "replicas" of one another.

This method is very beneficial for large data systems with vast quantities of data and many clients because the problems of coordination among all of the clients' indexing tools are obviated. By disposing of broadcast coherence messages and instituting replica management on a client-by-client basis, the distributed replica system operated according to these techniques is scaleable to enormous data pools, such as those serviced by the Internet.

Now, continuing with the above example, suppose that the transaction requested by client 54 causes a change or relocation in the storage space in the physical memory pages storing the data nodes. For instance, suppose the client 54 requests an update action to store more data on the database. The additional data exceeds the data page containing the requested search space, and results in the data page being split. A new data page is added and part of the contents of the old data page is moved to the new data page. An indexed side link is then established between the old data page and the new data page. The indexed side link contains an index term which defines the search space that now resides on the new data page and a pointer to the memory address of the new data page.

Following the data node split, the server 52 adds the new index term to the message to be sent back to the requesting client 54. The client 54 extracts the new index term from the message and updates its index replica so that it can locate the new data page. The server 52 also updates its own index to reflect the data node split. In this manner, only the client that causes the split receives the new indexing information from the server 52. The server is not responsible for transmitting coherence messages to other clients every time a node is split.

This technique for managing data on a server is efficient and minimizes the degree of interactivity required among the clients and server for purposes of data management and index replica management. There is no longer a constraint that all index replicas be identical or at least very similar, or that they be updated simultaneously for each page split. Moreover, it is perfectly satisfactory for each replica to grow and evolve independently of the others, without any loss of capability at accessing the underlying data. If a client wishes to update its own index replica, it may do so at its own convenience when processing demands and network traffic are low.

Figure 10:
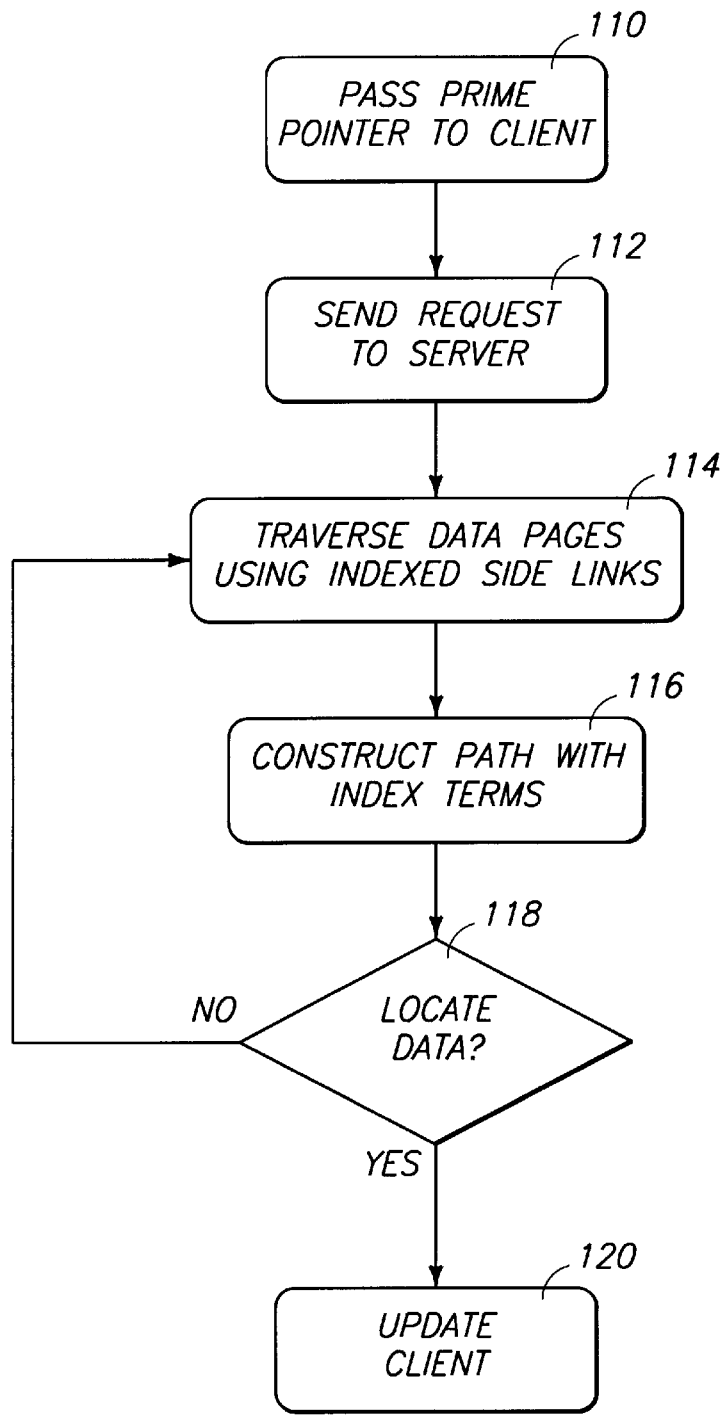
FIG. 10 shows steps in a method for creating or updating an index replica at a client by accessing the data pages on the server.

For purposes of continuing discussion, suppose that the other client computing unit 56, which did not cause the data node split, has no previous tree version and wants to create or establish its own tree replica. FIG. 10 shows the steps that client computing unit 56 and server 52 are programmed to perform. In this example, client 56 desires to replicate at least part of the index maintained at server 52 using the minimum information required by the client to gain access to and gradually construct the index replica. At step 110, a prime pointer is passed to the client 56. The prime pointer is stored in a known location in system 50. The prime pointer references the initial page, called a "prime page," to which all other pages are connected via side pointers. The prime page is responsible for the entire search space. One example of a prime page is page A in FIG. 6. Another example might be the first, leftmost, data node 64 in database 60 of FIG. 8.

The client 56 sends a request to server 52 to begin a search at the prime page referenced by the prime pointer (step 112 in FIG. 10). This request triggers a side traversal of the data pages 64 using the indexed side pointers 70 (step 114). If the request directs the server to an old page that no longer contains the data, the server uses the indexed side pointer from that old page to continue its search. The server constructs a path to the requested data, with each side traversal adding another index term to that path (step 116). The server continues its trek until it locates the requested search space (step 118). After the server locates the correct page and completes the action, a message is returned to the client containing the action result and the path information that is used to update the index replica (step 120).

As index terms are posted, the index pages of memory may fill and overflow. When an index term spills over onto a new index page, a higher level index node is created to distinguish the split index pages.

Under the data management architecture of this invention, index nodes split at each client completely independently of how they may be splitting at any other client. There is no coordination among the clients. The index replicas at the clients can contain different index nodes, with different index terms. The replicas may even have different tree heights. The state of completeness of an index replica reflects how many side traversals have been performed by the server on behalf of the client. It is again noted that splitting of a data page does not result in a broadcast to all index replicas at the clients. Only the replica whose traversal resulted in the update and data page split is notified, and even that notification may fail. The other clients simply learn in their own time.

Figure 11:
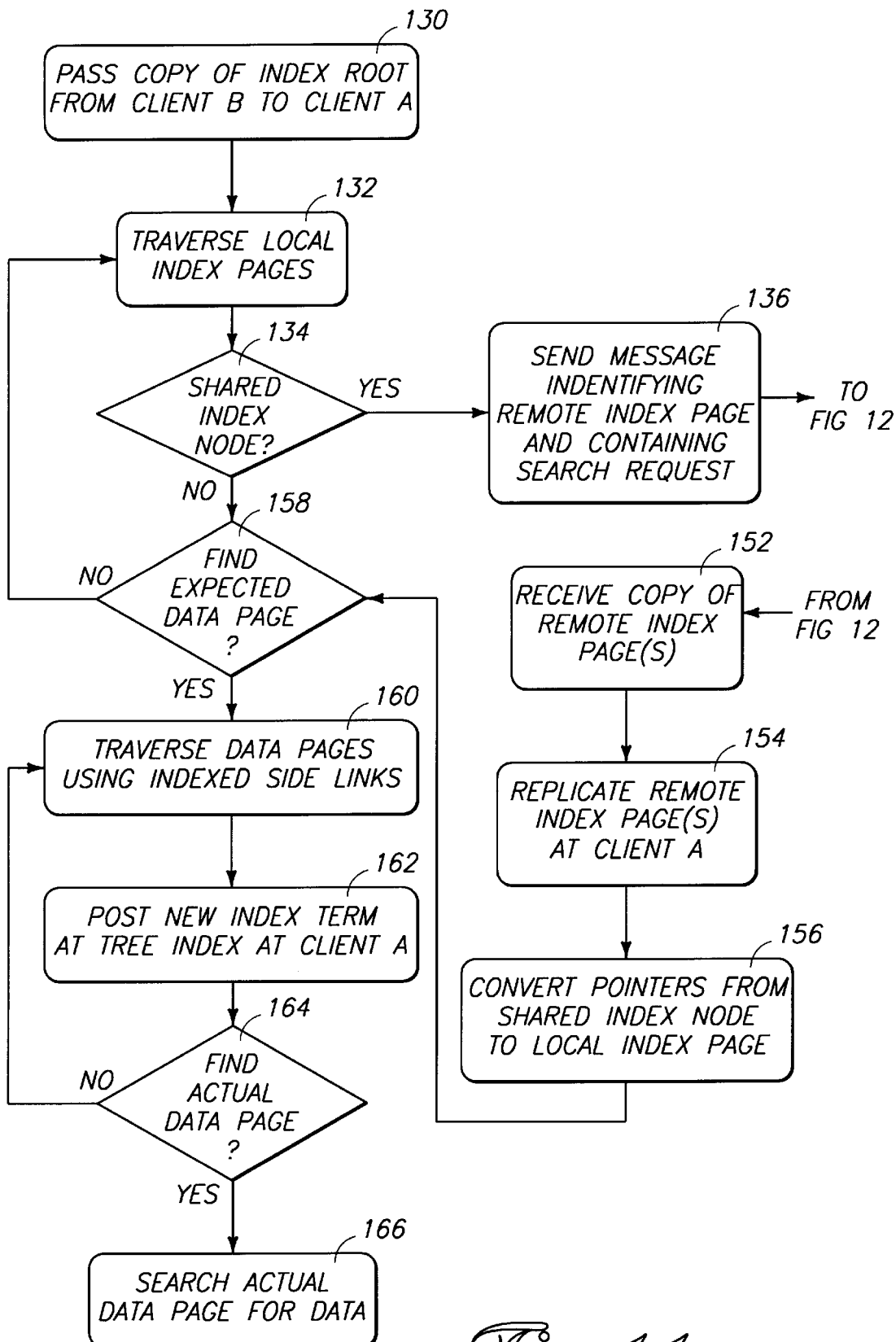
FIGS. 11 and 12 show steps in a method for creating or updating an index replica at a client by sharing index information from another client.
Figure 12:
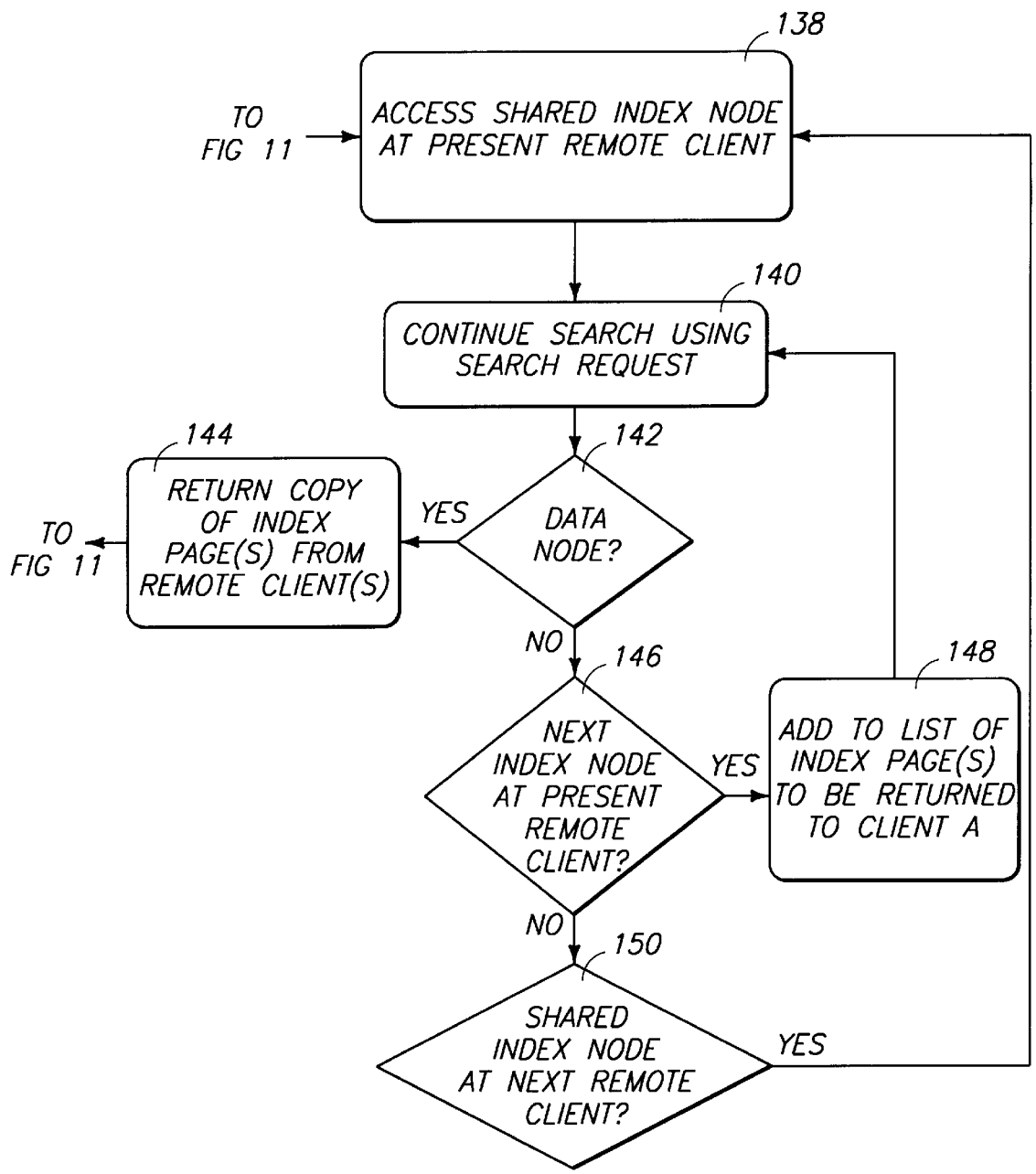

In the method of FIG. 10, each client independently discovers all of the index terms that it needs for its index replica. However, some of this information might already be known by other clients. Accordingly, there may be an opportunity to learn from other clients (or the server) as a way to optimize performance and minimize message requests to the server. FIGS. 11 and 12 illustrate a method performed by the clients and server in the data system 50 in which indexing information is shared among the clients. This method is explained with concurrent reference to FIG. 8. For discussion purposes, assume that client 56, which will be referred to as the "local client," wants to update or establish a tree index replica A. Local client 56 plans to share index information from an index replica B maintained at client 54, which will be referred to as the "remote client." At the initial step 130, instead of passing the prime pointer to client 56 like the method of FIG. 10, a copy of the root of the tree index replica at remote client 54 is passed in. In this way, the local client 56 receives a batch of indexing information for accessing the underlying data.

When the local client 56 starts processing search requests, it traverses its own local pages in the manner described above as if it had its own completely independent index replica (step 132 in FIG. 11). The local client will continue to use its own index replica until it encounters a reference to a shared index node located on another client's replica, or a reference to the expected data node (i.e., the loop formed by "no" branches in steps 134 and 158). When a search encounters an index term that references a shared index node in the index replica B at remote client 54 (i.e., the "yes" branch from step 134), the local client 56 constructs and sends a message 74 to remote client 54 for shared use of index replica B (step 136 in FIG. 11). The message identifies the shared index node and contains the search request itself.

The remote client 54 receives the request from local client 56 and accesses the shared index node identified in the message (step 138 in FIG. 12). The remote client 54 then proceeds with the search request, which was sent in the message, to continue the search in the shared index node (step 140 in FIG. 12). If the search of index replica B encounters a reference to a data node (i.e., the "yes" branch from step 142), the remote client 54 returns the index page 76, which has the contents of the shared index node, to local client 56 (step 144).

If the search leads to another shared index node within tree replica B (i.e., the "no" branch from step 142 and the "yes" branch from step 146), the remote client 54 continues the search of index replica B (step 140 in FIG. 12). Meanwhile, each index node encountered on index replica B during the search is added to the set of nodes that will eventually be returned to the local client 56 for constructing or updating index replica A (step 148).

If the search leads to a subsequent shared indexed node located at yet another client (not shown in FIG. 8) which maintains its own index replica C (i.e., step 150 in FIG. 12), the remote client 54 sends a message containing the pointer to the shared index node and the search request to the next remote client. This second remote client accesses the shared index node on its index replica C in search of the requested search space. The sharing of index nodes could feasibly lead to other clients as well, but assume that only index replica C is searched. The second remote client returns the appropriate node or nodes that are farther down the index tree to the first remote client 54, which then concatenates those nodes with the index nodes that it has traversed at index replica B. As step 144 indicates, remote client 54 eventually returns the entire concatenated sequence of index nodes to local client 56. It is noted that the remote client 54 might also add the index nodes returned from the second client to update its own index replica B.

Using a Pi-tree with side index terms at every level of the tree permits the remote client 54 to split its index nodes without the need to notify other clients that may be sharing its index nodes. Splitting nodes and posting side index terms works at every level of the Pi-tree, including the data nodes and the index nodes. The autonomy afforded to each client by the Pi-tree structure enables the clients to grow their index trees independently, and to share them with others without conflict.

At step 152 in FIG. 11, the local client 56 receives the index page(s) 76 from the remote clients. The local client 56 replicates the index page(s) 76 and adds the sequence of index page(s) to its private index replica A (step 154). The client 56 then changes the pointer to the shared index node that originally guided the search to the remote clients. The shared pointer is converted to a private pointer which references the local replicated copies of the index nodes received from other clients (step 156). Additionally, the acquired index page(s) might have references to storage resources local to the remote clients. These references, since previously maintained at the remote clients, contain only the addresses to the storage resources at the remote clients. When the index page(s) are replicated, the references are modified to reference both the storage resources and the remote clients to which those resources are associated so that the new local index pages can properly locate any data referenced therein. The local client 56 continues the search locally on the new index pages until it locates a reference to the data page where the search space is expected to reside (step 158).

Once the expected data page is found, the local client 56 performs essentially the steps described above with respect to FIG. 9. The process involves sending the search request and the address of the data page to the data server 52. However, as discussed above, it is possible that the search space has moved from the expected data page to another data page. Accordingly, at step 160 in FIG. 11, the indexed side links are used to side traverse the data structure from one data page to a next. The server keeps track of the new index terms associated with each side traversal, and eventually returns the new index terms to the client 56 for posting in the index replica A (step 162). The side traversal continues until it finally uncovers the actual data page that contains the search space specified in the request (i.e., the "yes" branch in step 164 of FIG. 11). At that point, the server carries out the action request by the client 56 (step 166).

The server returns the index terms generated by the side traversals, and the local client 56 adds the index terms to the appropriate page(s) of its index replica A. Structure modifications at the local index replica, such as index page splits, are performed as needed to store the new index terms.

With this index sharing method, there is once again no need to broadcast coherence messages to all clients. The index sharing technique is a performance enhancement that permits a more rapid construction of a tree replica at a particular client site. At any time after the client has acquired a complete path to the prime data page, all index terms pointing to shared index nodes can be dropped without sacrificing search correctness or the ability to eventually complete the replica. However, sharing index pointers optimizes the construction of every unfinished part of a new index replica. So retention of the shared index nodes is of value for this optimization. Accordingly, if there is an opportunity to optimize, the node sharing technique is executed; otherwise, the system will employ the learn-on-your-own method described above with respect to FIG. 10.

This technique requires that index terms referring to index nodes carry with them a way of identifying the client site at which they are instantiated. This can be accomplished by an additional bit or two which distinguishes pointers to local index nodes available on the local tree replica from pointers to shared index nodes in tree replicas maintained at remote clients. Note, however, that the pointers to the data pages are unaffected by the shared index optimization. The data page pointers are stored at the index level immediately above the data level and constitute the vast majority of index terms. Only higher levels are impacted, which is often less than one per cent of the size of the replicated index.

By distributing and replicating indexes, the load on a server is greatly reduced. Off-loading the index search to clients permits a substantial scale-up in the number of clients that can be served with the indexed data. The server is no longer required to access its own index to satisfy search requests. Only an occasional traversal of an indexed side link is required beyond simply fetching the requested page. However, a single central data server can be a potential bottleneck. To scale further, the data itself needs to be distributed among multiple servers.

Figure 13:
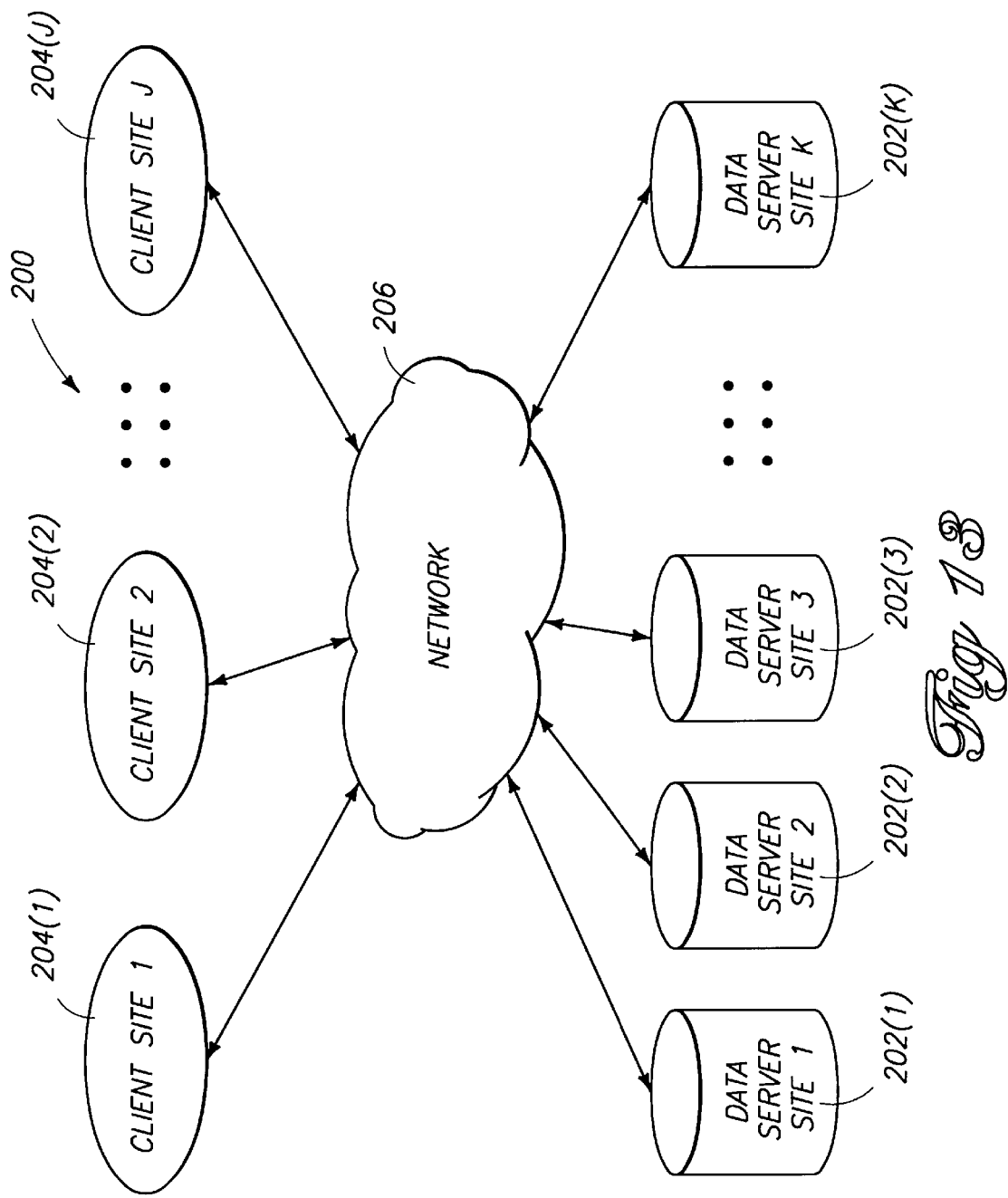
FIG. 13 is a diagrammatic illustration of a distributed data management system having data distributed over multiple server sites and replicated indexes at multiple clients.

FIG. 13 shows a distributed data management system 200 having data distributed over multiple server computing sites 202(1), 202(2), 202(3), . . . , 202(K). As above, the data is organized in a tree index structure having index nodes to direct access to the data. The data is stored on memory pages that are connected by indexed side links to direct side access traversal from one memory page to the next. One preferred implementation is to organize the data in a Pi-tree index structure. In this implementation, however, the data pages are distributed over the multiple server sites and the side pointers additionally contain network addresses to the server sites which maintain the adjacent data pages.

The distributed data management system 200 also has multiple client processing units 204(1), 204(2), . . . , 204(J) connected to the servers 202(1)–202(K) via a network 206. The network 206 can be constructed using wire based technologies (cable, telephone, etc.), wireless technologies (cell phone, satellite, RF, etc.) or a combination of both. Example implementations of network 206 include a LAN, WAN, or public network (i.e., Internet). The client processing units 204(1)–204(J) use their respective, locally maintained index replicas to individually access the distributed data on the different server sites 202(1)–202(K).

The data is distributed over the servers according to a distribution policy that specifies which server site is to host a new data page. Example distribution policies include opportunistic, randomized, and range. An "opportunistic" distribution policy chooses the same server site at which the node is split as the site to host the new page created by the node split. This policy reduces communications cost by keeping the split pages together at the same site. In a "randomized" distribution policy, the server site chosen for any newly created page is based on a randomization process that uniformly distributes the load across all of the sites. In a "range" distribution policy, the server sites are assigned particular ranges of key values to store. New pages are allocated at the site handling the key range involved. This localizes range searching to a smaller number of server sites.

Regardless of which distribution policy is employed, redistribution of data among the server sites will undoubtedly be required at times. System configuration might change, update activity might skew the load, or too many keys might fall into one range. Unbalanced loads are possible with essentially all data placement policies without resorting to very substantial coordination message overhead.

Figure 14:
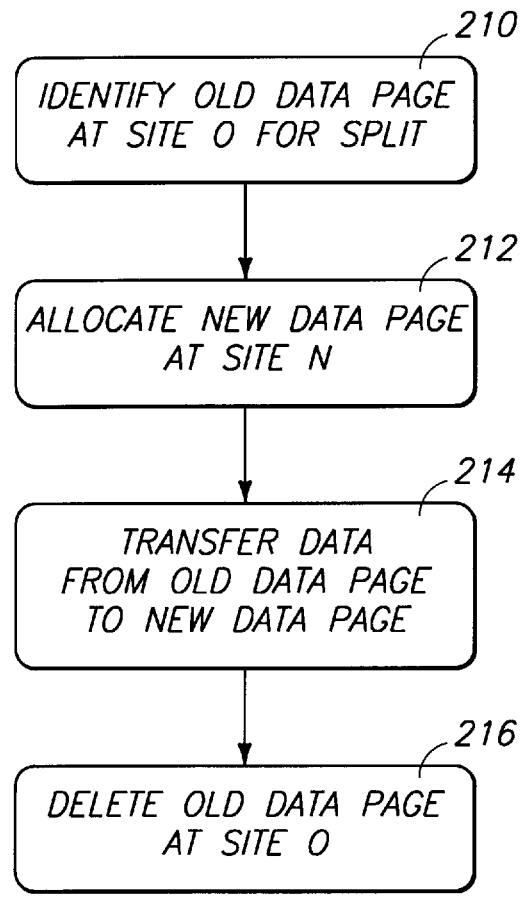
FIG. 14 shows steps in a method for load balancing data across the server sites.

FIG. 14 shows steps in a method for balancing data among the various server sites as new data is added to the distributed data management system 200. In general, load balancing is performed by migrating memory pages from one site to another. This migration is a function of node splitting and node deletion. At step 210, identify at a first server site a page whose data it is desired to move. A new page is then created at a second server site (step 212). The data is transferred from the existing page on the first server site to the new page at the second server site (step 214). The two steps 212 and 214 are essentially a data node splitting technique, except that the new data page is created at a different server site. Thereafter, the existing data page is deleted from the first server site (step 216).

This method effectively migrates the contents of a data page from one server site to another. Accordingly, data maintained on pages at a site with a comparatively higher concentration of data can be shifted to new pages at a server site having a comparatively lesser concentration of data. This data shuffling balances the distribution of data across the server sites.

Some precautions are taken to ensure that the distributed tree structure can recover from a system crash without degrading search correctness. First, the action of splitting a data node is made atomic. Within the same atomic action, the following three tasks are performed.

1. The new data page is allocated.
2. The new data page is initialized with approximately half of the contents of the existing data page.
3. The existing data page is updated to remove the contents now stored in the new data page and to have an indexed side link that identifies the new data page as the place where a search is to continue.

The new data page and the old data page may be located at the same site, but in the above example, they are located at separate sites. If co-located, atomicity is relatively easy to provide. When at separate sites, on the other hand, atomicity is achieved via a distributed commit protocol. To describe the distributed commit policy, suppose the data page migration involves an old server site O which contains the existing or old data page and a new server site N which contains the new data page. Server site N writes the data from the old data page into the new data page and prepares its part of the atomic action. Server site N then notifies old server site O that the old page has been split, and sends the key value used in accomplishing the split and the address of the new data page. In the same message, new server site N transfers commit coordination to old server site O.

Old server site O removes the data that is now written in the new data page and inserts an indexed side link in the old data page that refers to the new data page at the new server site N. The old server site O then commits the atomic action locally. New server site N waits to receive a separate access request for the new page before committing its creation of the new page, thus using this access message as a lazy commit message. Should the new server site N wait too long, it asks the old server site O whether the action is committed. It may need to inquire in any event as commit messages may be lost. Old server site O remembers the commit status and answers such inquiries by simply checking whether the old page has been updated with the indexed side link to the new data page.

According to this method, only one message is used to both transfer information and to coordinate the distributed atomic action. This reduces network traffic and provides better efficiency in balancing the distributed data load across the server sites.

To keep the data level search correct when a data page is deleted, the following actions are atomically performed.

1. The "container" page (i.e., the data page with an indexed side link to the deleted page) is updated with the data and the indexed side links of the deleted page so that all data for which the containing page is ultimately responsible remains accessible.
2. The old page is deleted and a tombstone containing a forwarding address to the container page is established.

Index correctness is preserved in a very lazy fashion. No index replica is involved in a delete atomic action. A data page delete only requires an atomic action involving the old server site O with the page to be deleted and a server site C which serves the container data page. These sites may be asked to handle accesses related to the deleted node for some time after the delete has been accomplished.

Server site O keeps a tombstone or other marker for the deleted page for as long as any index replica in the system may have a pointer to the deleted page. The tombstone contains a forwarding address to the container page now responsible for the search space of the deleted page. In addition, the tombstone identifies the search space of the deleted data page. This permits accesses to distinguish invalid references to the deleted page from valid references to the same page when the page is reused. All incoming data page accesses are checked with the tombstone table before accessing a data page. This tombstone table is store in persistent memory at the appropriate server site, but is small enough to be cached entirely in volatile memory.

To keep the tombstone table small, the tombstones are garbage collected. Server site C notifies the server site O when the tombstone for the deleted page is no longer needed. In the container page at server site C, there is control information for every deleted page that the container page has absorbed that has an outstanding tombstone. The control information has a description of the search space of the deleted page together with a bit vector with a bit for each index replica that is being maintained at the client sites. The bit is set if the associated index replica has a dangling pointer to the deleted page, and reset otherwise.

There are two ways to access the search space that had previously been handled by the deleted data page. The first approach is to access the search space by way of the tombstone. When an access request comes to server site O, the request is forwarded to server site C (as if it were a side traversal) together with an indication that this request comes via the tombstone. Server site C satisfies the request by locally accessing the container data page and returns the data requested, the container page address, and an indication that the deleted node has in fact been deleted. The requesting client then removes its index term referring to the deleted page.

The second approach is to access the search space directly in the container page at the server site C. When a request specifying a search that is within the space previously handled by the deleted data page comes directly to the container page, it is clear that the index replica used to reach that point no longer contains a dangling pointer to the deleted node. The bit associated with that index replica in the container page is reset. The request is then answered in the normal fashion.

When all bits in the bit vector have been reset, server site C tells server site O that the tombstone for the deleted page can be garbage collected. This does not require a two site atomic action. Rather, server site O simply drops the tombstone in a local atomic action. It then notifies server site C that the tombstone is gone. Should either message be lost, server site C will eventually ask server site O to delete the tombstone again and server site O will comply or simply report that this has been done already.

Handling page deletions is optional for the container page, which is asked to accept data and control information from the deleted pages. To control the number of deleted pages that the container page handles, the container page can refuse to participate in some or all of the page deletions.

It is noted that the deleted page can serve as its own tombstone. The cost is that the page itself is not garbage collected until all replicas have referenced the container page directly. The benefit is that no separate tombstone table is needed, and there is no tombstone "look-aside" needed before accessing data pages at a site. If deletion is sufficiently uncommon, this is a suitable strategy. If deletion becomes more common, the need to reclaim space becomes more urgent, justifying a separate tombstone table.

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

I claim:

1. In a data management computing system having data organized according to a tree index structure and supporting access to that data from multiple processing units through a distributed tree index architecture where at least a portion of the tree index is provided at the multiple processing units, a computer-implemented method for maintaining the tree indexes at the multiple processing units comprising the following steps:

accessing the data from the processing units using their corresponding tree indexes;

during said access by one of the processing units, changing a storage location of a particular search space; and updating the tree index at said one processing unit without updating the tree indexes at others of the processing units.

2. A computer-implemented method as recited in claim 1 wherein the index tree structure comprises a Pi-tree index.

3. A computer-implemented method as recited in claim 1 further comprising the step of updating the tree index of said other processing units individually as each of said other processing units access the changed storage location.

4. A computer-implemented method as recited in claim 1 further comprising the step of sharing the tree index of a different processing unit to access the data.

5. A computer-readable medium which directs a computer to perform the steps in the method as recited in claim 1.

6. A computer programmed to perform the steps in the method as recited in claim 1.

7. A tree index formed in memory as a result of the computer-implemented method recited in claim 1.

8. A computer-implemented method as recited in claim 1 further comprising the step of enabling the tree indexes of the processing units to evolve independently of one another without converging to one common form.

9. In a data system constructed according to a Pi-tree file structure having indexes replicated over multiple computing sites, an index maintenance manager stored in a storage medium and executable on a processor to perform the following steps:

creating an indexed side link, in response to a data node split caused by a request from a particular computing site, to connect an old data node to a new data node formed in the split;

constructing a message containing index terms indicative of the created indexed side link; and sending the message to the requesting computing site to update the index maintained at the requesting computing site without sending similar messages to other computing sites.

10. A data system comprising:

a database configured in a tree index file structure having data nodes representative of memory pages used to store data and index nodes representative of memory pages used to store information to index the memory pages, the tree index file structure being characterized by use of indexed side links between data nodes to permit side traversal from one memory page to the next;

multiple client processing units connected to access the data on the database, the index nodes being at least partially replicated and maintained locally at the client processing units;

individual ones of the client processing units being capable of independently manipulating the data on the database in a manner which changes a storage location of particular data;

in an event one of the client processing units causes a storage location change, the database providing update information to update the index nodes at said one client processing unit to reflect the storage location change without providing the update information to others of the client processing units.

11. A data system as recited in claim 10 wherein the tree index file structure comprises a Pi-tree.

12. A data system as recited in claim 10 wherein the database provides update information to update the index nodes at said other client processing units as each of said other client processing units accesses the changed storage location.

13. A data system as recited in claim 10, wherein the index nodes are free to evolve independently of one another without converging to one common form.

14. In a distributed data management system having data distributed over multiple computing sites and organized in a tree index structure having index nodes to direct access to the data, the data being stored on memory pages that are connected by indexed side links to direct side access traversal from one memory page to the next, the distributed data management system further having multiple client processing units capable of accessing the distributed data on the different sites using replicas of the index nodes maintained locally at the client processing units, a computer-implemented method for managing the data distribution among the multiple sites comprising the following steps:

identifying an existing data page at a first site;

creating a new data page at a second site;

transferring at least some of the data from the existing data page at the first site to the new data page at the second site;

deleting the existing data page at the first site; and individually updating each tree index replica at a client processing unit as that processing unit accesses the transferred data without updating the tree index replicas at other processing units.

15. A computer-implemented method as recited in claim 14 wherein the creating step comprises the following three steps which are performed as a single atomic action:

allocating the new data page in memory at the second site;

storing at least some of the data from the existing data page onto the new data page; and updating the existing data page by removing that data that is now stored on the new data page and creating an indexed side link from the existing data page to the new data page.

16. A computer-implemented method as recited in claim 14 wherein the creating step comprises the following steps:

allocating the new data page in memory at the second site;

storing at least some of the data from the existing data page onto the new data page;

sending a message from the second site to the first site notifying the first cite that the existing page has been split and an address to the new data page, the message containing commit coordination;

updating the existing data page by removing that data that is now stored on the new data page and creating an indexed side link from the existing data page to the new data page;

committing atomically at the first site; and upon receipt at the second site of a new access request for the data on the new data page, committing atomically at the second site.

17. A computer-implemented method as recited in claim 14 wherein the deleting step comprises the following steps which are performed as a single atomic action:

posting the indexed side link supported by the deleted data page to a containing data page that contains an indexed side link to the deleted data page; and establishing a marker representative of the deleted data page containing a forwarding address to the containing data page.

18. A computer-implemented method as recited in claim 14 further comprising the step of enabling the tree index replicas of the processing units to evolve independently of one another without converging to one common form.

19. In a data management system having a data server supporting multiple client processing units, the data server storing data in a tree index structure having index nodes to direct access to the data, the data being stored on memory pages that are connected by indexed side links to direct side access traversal from one memory page to the next and the index nodes being replicated and maintained at the client processing units, a computer-implemented method comprising the following steps:

receiving a request at the data server from a client processing unit, the request identifying a type of action and a data page expected to contain a search space to be affected by the action;

in an event that the data page identified in the request contains the search space, performing the action;

in an event that the data page identified in the request does not contain the search space, side traversing from the identified data page using the indexed side links to an actual page which contains the search space;

constructing a message containing index terms indicative of each indexed side link traversed; and sending the message and request results back to the client processing unit that originated the request to update the index nodes maintained on the client processing unit without sending similar messages to other computing sites that did not originate the request.

20. A computer-implemented method as recited in claim 19 wherein the action comprises an update action to store more data, comprising the following additional steps:

causing, by virtue of storing more data, a split in the data between an existing data page and a new data page;

creating an indexed side link from the existing data page to the new data page; and adding an index term indicative of the created indexed side link to the message.

21. A computer-readable medium which directs a computer to perform the steps in the method as recited in claim 19.

22. A data server programmed to perform the steps in the method as recited in claim 19.

* * * * *